United States Patent

Milios et al.

Patent Number: 5,860,099
Date of Patent: Jan. 12, 1999

[54] STORED PROGRAM SYSTEM WITH PROTECTED MEMORY AND SECURE SIGNATURE EXTRACTION

[75] Inventors: Ioannis Milios; Carl Oppedahl, both of New York, N.Y.

[73] Assignee: USAR Systems, Inc., New York, N.Y.

[21] Appl. No.: 61,203

[22] Filed: May 12, 1993

[51] Int. Cl.[6] ............................... G06F 12/00; H04L 9/00
[52] U.S. Cl. ..................... 711/103; 711/163; 711/164; 380/3; 380/4
[58] Field of Search .............................. 264/200; 95/400; 395/425, 430, 490, 725, 491, 492; 380/4, 3

[56] References Cited

U.S. PATENT DOCUMENTS

| | | | |
|---|---|---|---|
| 4,467,444 | 8/1984 | Harmon, Jr. et al. | 364/900 |
| 4,584,665 | 4/1986 | Vrielink | 364/900 |
| 4,698,750 | 10/1987 | Wilkie et al. | 395/425 |
| 5,099,516 | 3/1992 | Durkin et al. | 380/4 |
| 5,101,498 | 3/1992 | Ehlig et al. | 395/800 |
| 5,144,659 | 9/1992 | Jones | 380/4 |
| 5,175,840 | 12/1992 | Sawase et al. | 711/103 |
| 5,191,608 | 3/1993 | Geronimi | 380/4 |
| 5,224,166 | 6/1993 | Hartman, Jr. | 380/50 |
| 5,251,304 | 10/1993 | Sibigtroth et al. | 395/375 |
| 5,255,244 | 10/1993 | Dey | 365/233 |
| 5,282,247 | 1/1994 | McLean et al. | 380/4 |
| 5,349,249 | 9/1994 | Chiang | 307/465 |
| 5,351,216 | 9/1994 | Salt et al. . | |
| 5,379,433 | 1/1995 | Yamagishi | 395/725 |
| 5,386,469 | 1/1995 | Yearsley et al. | 380/3 |
| 5,388,157 | 2/1995 | Austin | 380/4 |
| 5,396,609 | 3/1995 | Schmidt et al. | 395/490 |

OTHER PUBLICATIONS

Microchip data book, 1993, pp. 2–28, and 3–6.
Technology: Required Documentation for Software Validation Medical Device & Diagnostic Industry, Jul. 1993, pp. 94–98.
Motorola Advance Information, MC68HC05C4 8–Bit Microcomputers 1985 pp. 2–9 and 2–10.
Intel 8–Bit Embedded Controllers 8051AHP MCS–51 Family and 80C51BHP 8–Bit Microcomputer With Protected ROM, Oct. 1990, pp. 7–62 & 7–132.

Primary Examiner—Tod R. Swann
Assistant Examiner—Tuan V. Thai
Attorney, Agent, or Firm—Oppedahl & Larson

[57] ABSTRACT

A controller contains software which, when triggered in some prearranged way such as assertion of an input to the controller, calculates a digital signature for the contents of the protected memory of the controller. The digital signature is preferably extracted from the contents of the memory with a function that varies greatly with even small changes to the memory contents. The function preferably is such that one cannot easily determine from the output what input generated the output. The function is preferably such that one cannot easily create a data set for input that yields any particular predetermined output. The circuitry generating the signature may be embedded in hardware of the controller so that its digital signature function is unknown even to the programmer writing the main body of code to be stored in the protected memory. With such a hardware configuration, it is possible to have a very high degree of confidence that the memory contents are what they are expected to be.

4 Claims, 4 Drawing Sheets

5,860,099

STORED PROGRAM SYSTEM WITH PROTECTED MEMORY AND SECURE SIGNATURE EXTRACTION

BACKGROUND OF THE INVENTION

The invention relates to verification of firmware programming, and relates particularly to verification of the programming of read-protected firmware.

It is well known to use a microprocessor in a system having a stored program in memory to accomplish any of a variety of functions for a user. The stored program may be in RAM but in many present-day systems the stored program is in ROM, PROM, EEPROM or nonvolatile RAM.

It is also well known to use a controller, a term that is generally used to describe a single-chip integrated circuit with a processor, some input/output port circuitry, and some onboard memory to accomplish user functions. Many controllers are made so that the stored program may be stored in ROM or PROM or EEPROM that is part of the controller package. Such a package offers many engineering benefits, including small parts count, low cost, and simple design, at least for those user functions that fall within the computational and I/O capabilities of the controller. Controllers are used for many consumer applications, including the control of mechanical devices such as clothes washers. Controllers are also used for many industrial control applications. Many personal computers use controllers to handle serialization of key scan codes within the keyboard, to handle receipt of serial scancodes from the keyboard, and to handle motherboard functions external to the main processor. In laptop and notebook computers it is commonplace to use a controller for floppy disk and hard disk control, as well as for power management.

The design process for use of a controller in an application necessarily involves some software design since the controller is useless without firmware. The programming tasks are more daunting than most modern-day high-level language programming tasks, for several reasons. First, a high-level language task typically is running on a relatively fast processor, so that the code need not be particularly efficient. Second, most high-level programming tasks are able to ignore time-critical issues such as the servicing of interrupts and frequency of polling for data values, because the hardware and operating system protect the high-level language programmer. Third, for many high-level language tasks memory is considered to be arbitrarily low in cost so that no one cares how large the program is.

In contrast, the firmware coding for a controller application is often quite difficult. The computational task has to be accomplished with the typically slow processor found in a general-purpose controller. The computational task requires that the programmer be skilled in handling of interrupts and other time-critical events. The memory is not unlimited, but is often quite small by modern standards, so that conservation of bytes matters. Heaped onto these factors is the fact that much of the coding has to be in machine language or assembler rather than a high-level language to accomplish the desired goals. It will be appreciated that the programming skills and insights required in the programming of a controller are quite different from those of the average high-level language programmer, and indeed bring to mind the programming skills that were required decades ago when core memory meant iron cores and 256 bytes was a common core size. Another way to appreciate the challenge of the controller programming tasks is to realize that the software written for execution in a controller is not an application running over an operating system, but instead is software that must fulfill all requirements of both the application and the operating system.

These considerations make it unsurprising that the engineering community has demanded, and the chip makers have supplied, controllers that are made so that the firmware cannot readily be read or otherwise obtained by one who is in possession of a controller. This contrasts most strikingly with systems having a processor and a distinct ROM chip which could be read out in straightforward fashion using commonly available electronic equipment. Such a controller is sometimes called a "copy protected" controller.

For many applications, especially noncritical consumer applications, the copy protected controller satisfies all its demands well. The firmware is in a nonvolatile store, so that it may be relied upon even if power is interrupted. The many benefits of the use of a controller, such as the small chip count and savings of space, are available. And the executable code, stored in the "copy protected" memory, is safe from prying eyes.

For some applications, however, such as those with safety and government regulatory, approval, exemption or certification requirements, the copy protection feature of the controller runs afoul of the perfectly understandable desire on the part of the regulator to be able to be sure it knows what is in the copy-protected memory. In a typical regulatory setting such as the U.S. Food and Drug Administration there is an initial approval, exemption or certification activity that leads to a particular regulatory status for an item of equipment. It may later be necessary, however, for the regulator to be able to perform spot checks of the items of equipment from time to time. Among the spot checks may be checks that individual components are identical to the components that were in use when the equipment was first certified. The difficulty arises, however, when a copy-protected controller is used, that the regulator is not readily able to determine whether a controller is, or is not, programmed identically to the controller that was used at the time of the initial approval or certification.

The usual engineering decisions that have been made in such circumstances have been either to abandon use of a controller completely, using instead separate chips the contents of which can be read out if necessary to satisfy the regulator, or to switch to a controller that is not copy-protected, namely that permits direct readout of the contents of the stored program memory.

It is thus desirable to have a way to make a system including a controller, in which the stored program of the controller is safe from prying eyes, and yet in which a party wishing to confirm the contents of the stored program, as for regulatory purposes may readily do so.

SUMMARY OF THE INVENTION

In accordance with the invention, a controller contains software which, when triggered in some prearranged way such as assertion of a unique input combination to the controller, calculates a digital signature for the contents of the protected memory of the controller. The digital signature is preferably extracted from the contents of the memory by means of a function that varies greatly with even small changes to the memory contents. The function preferably is such that one cannot easily determine from the output what input generated the output. The function is preferably such that one cannot easily create a data set for input that yields any particular predetermined output.

In a preferred embodiment, the circuitry generating the signature is embedded in hardware of the controller so that its digital signature function is unknown even to the programmer writing the main body of code to be stored in the protected memory. With such a hardware configuration, a regulator may have a very high degree of confidence that the memory contents are what they are expected to be.

DETAILED DESCRIPTION OF PREFERRED EMBODIMENTS

Figure 1:
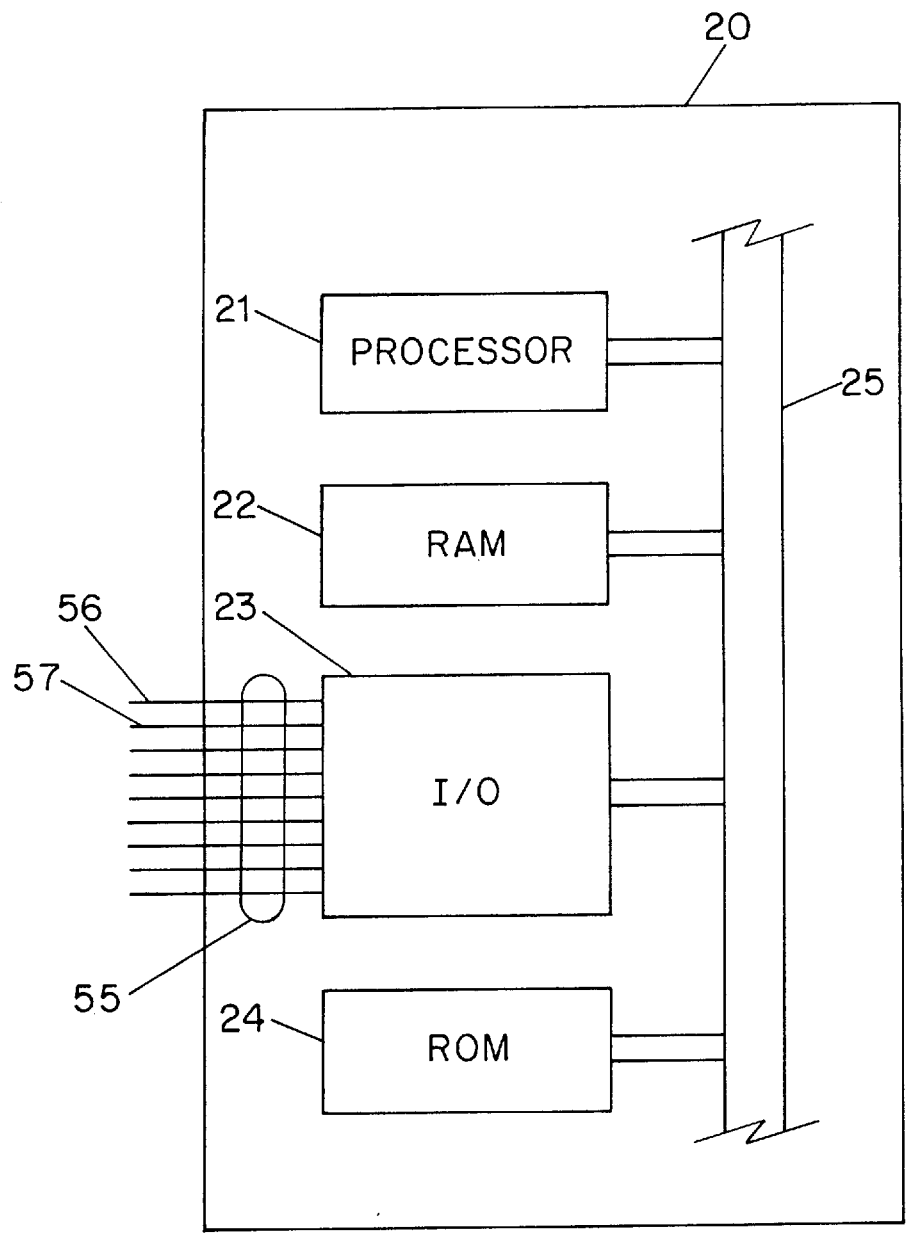
FIG. 1 is a functional block diagram of the hardware of a controller.

FIG. 1 shows the hardware of a controller 20. The controller hardware includes a processor 21, RAM 22, which may be dynamic or static RAM depending on the system design, I/O circuitry 23 which has lines 55 which are preferably programmable to provide input or output lines as desired, and permanent memory 24 which may be field-programmed PROM, or factory-masked ROM, depending on the particular controller design selected. Such controllers are commercially available and typical controllers are the families of Motorola 6805, Intel 8051, National COP800 and Zilog 8602.

In a prior art system employing a controller 20, the program stored in the memory 24 would be of conventional design so as to perform whatever function is desired for the user.

Some controller models falling within the general family characterized in FIG. 1 are of a type that permits the contents of the memory 24 to be read out with commonplace digital test equipment. In some controller designs, for example, the entire bus 25 linking the processor 21 and memory 24 is provided externally to the controller 20, and it is possible to read the contents of the memory 24 by halting the processor and generating bus read cycles by external means. In other controller designs, for example, it is possible to divert program flow out of the software of the memory 24, so that the processor 21 is fetching and executing code located elsewhere than in the memory 24. In that case, the code can cause the processor to read data from the memory 24 and write the data to points external to the controller 20.

In the system according to the invention, however, the controller 20 that is used is selected from among the set of controller models that protect the contents of the memory 24. Such controllers are typified by the Motorola MC68HC05C4/C8 and Intel 8051AHP/BHP. In such a controller, the bus 25 is not made fully available to equipment outside of the chip, and it is not possible to divert program flow in a way that would cause the processor 21 to fetch from locations outside of the memory 24. As was discussed above, such a controller, called a "copy-protected" controller, has the advantage that it shields the code in memory 24 from prying eyes. Such a controller has the disadvantage, however, that absent the capabilities of the invention it is not possible for a regulatory agency to have a high confidence level that a particular controller chip contains code identical to that of some earlier controller chip.

In a first embodiment of the invention, the hardware of the system is that shown in FIG. 1, and there is provided in the software of the memory 24 a signature routine. The routine, described further below, monitors for the reception of a predetermined input to the chip. If the input is received, the processor executes a subroutine that extracts a signature from the contents of some or all the memory 24. The simplest and preferred mode is that the subroutine extracts the signature from the entirety of the memory 24.

The signature having been extracted, preferably the processor outputs the signature serially on an output pin of the chip. Equipment external to the chip receives the serial stream, interprets it in numerical or character form, and compares the signature with the expected signature. In the event of a match, the external equipment indicates that the chip is "authentic", that is, that it matches a previously inspected chip. Preferably the external equipment generates the input to the chip as well, so that a single piece of external equipment provides the entire inspection service.

In a particular embodiment the input to the chip is a signal to an input line 56, or a combination of inputs, and the serial output from the chip is a signal on an output line 57.

The particular signature function employed could be any of several functions. Computationally simplest would be an additive checksum. Where the system need is simply to distinguish between version levels of chip firmware in the memory 24, the checksum is more than adequate.

Another signature that could be employed is a mere software version number stored in the memory 24; the signature function does no more than read out the version number and provide it as an output. This signature is likewise adequate if the only need is to distinguish software version levels. The checksum approach is, of course, better, since it will reveal even software changes where, through inadvertence, the embedded version number did not get changed.

Yet another signature that could be employed is the well known cyclical redundancy check or CRC. With a CRC, the memory contents are passed through any of a number of well-known CRC functions to yield a signature.

In some regulatory situations it may be desired to be able to confirm not only that there has been no inadvertent use of a chip containing different code, but also that no one has intentionally changed the protected code in a way that is intended to conceal the change. In such a situation the checksum would not be adequate because a change could be concealed by providing a single byte of a value selected to make the new checksum match the old one. Even a CRC would not necessarily be proof against an attempt to conceal, since depending on the particular CRC used, as few as sixteen easily chosen bytes may suffice to make the new checksum match the old one.

In such situations it is preferable to employ a function for which the inverse is not easily determined. Such functions are well known and the particular function selected plays no part of the invention. Such a function will ideally have an output that changes widely and unpredictably with small changes in the input. The function takes account of not only the contents of the bytes of the protected memory but also their sequence within the memory, so that if two bytes were swapped, the output would change. It will be appreciated that a simple checksum would not detect such a swap.

One function that is well known for this purpose is a function that passes the input, interpreted as an integer, through a polynomial. The coefficients are chosen typically as large primes, large relative to the value of individual bytes of the protected memory. The value of the polynomial is reduced by modulo arithmetic, e.g. a prime number is repeatedly subtracted to yield a remainder which is termed the signature, or the value is divided by the prime number leaving a remainder, the two being equivalent.

It will be appreciated that many functions, including chaotic functions, will work for the purposes contemplated here. The signature function preferably maps the space defined by the contents of the protected memory into a much smaller space, such as a sixty-four bit space. There is thus obviously some collapsing, that is, for any particular output value of the function, there will be a multitude of inputs that could yield the output. What is important here is that much of the content of the protected memory is constrained since it has to be capable of running as a program when fetched and executed by the processor. As a consequence, one who wished to change the stored code in a way that went undetected would have to stumble, through prodigiously time-consuming trial and error, upon a data content for the protected memory that would yield the signature and also execute. In general no such alternative data content would satisfy both requirements, thus concealed changes would be impossible.

If the would-be concealer of a code change also were to be able to change the content of the signature-extraction program, then of course it would be a straightforward matter to modify the signature-extraction program so that it no longer extracted signatures, but instead simply printed a false "signature" chosen to mislead. Thus it is desirable to minimize the number of people able to change the content of the signature-extraction program. In the embodiment where the program is stored in the same protected memory as the main program of the controller, it is desirable to control who loads the software into the controller, so that there can be some assurance that the signature-extraction software is authentic, and thus trustworthy.

Figure 2:
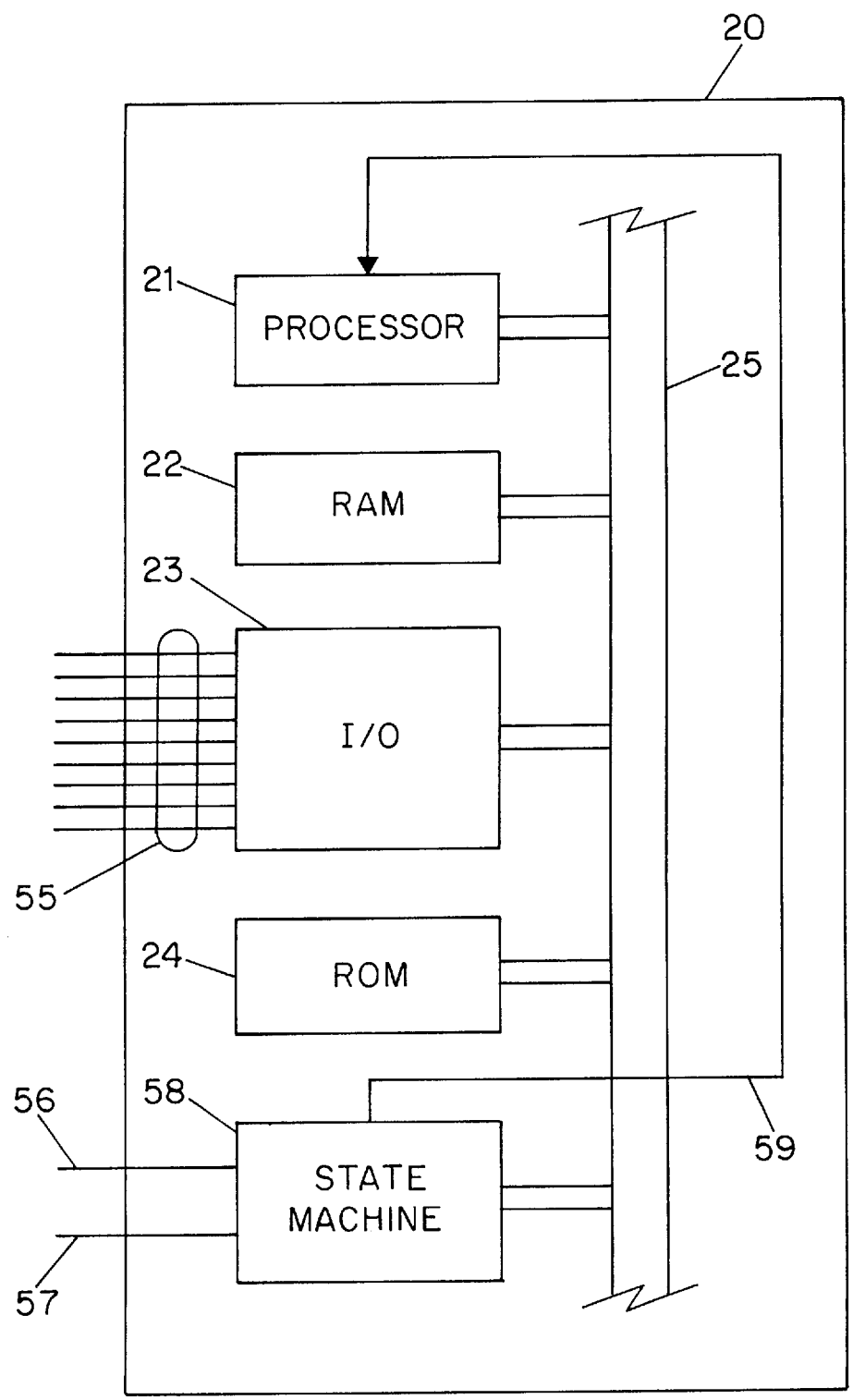
FIG. 2 is a functional block diagram of the hardware of a controller using the state-machine embodiment of the invention.

In another embodiment of the invention, dedicated hardware is provided to accomplish signature extraction. In FIG. 2 there is shown a controller similar to that of FIG. 1, except that there is provided an independent hardware state machine 58 to extract the signature. The state machine 58 has access to the protected memory so that it can receive bytes thereof and calculate the signature. The state machine 58 is preferably started by a signal external to the chip, such as a line 56 held high for a predetermined interval. The state machine 58 interrupts the processor 21 of the controller via a control line 59, and gives control back to the processor when the signature has been extracted and has been communicated out of the chip 20.

Alternatively the signature-extraction means could be a dedicated processor executing a stored program, with access to the protected memory for the purpose of extracting the signature.

Figure 3:
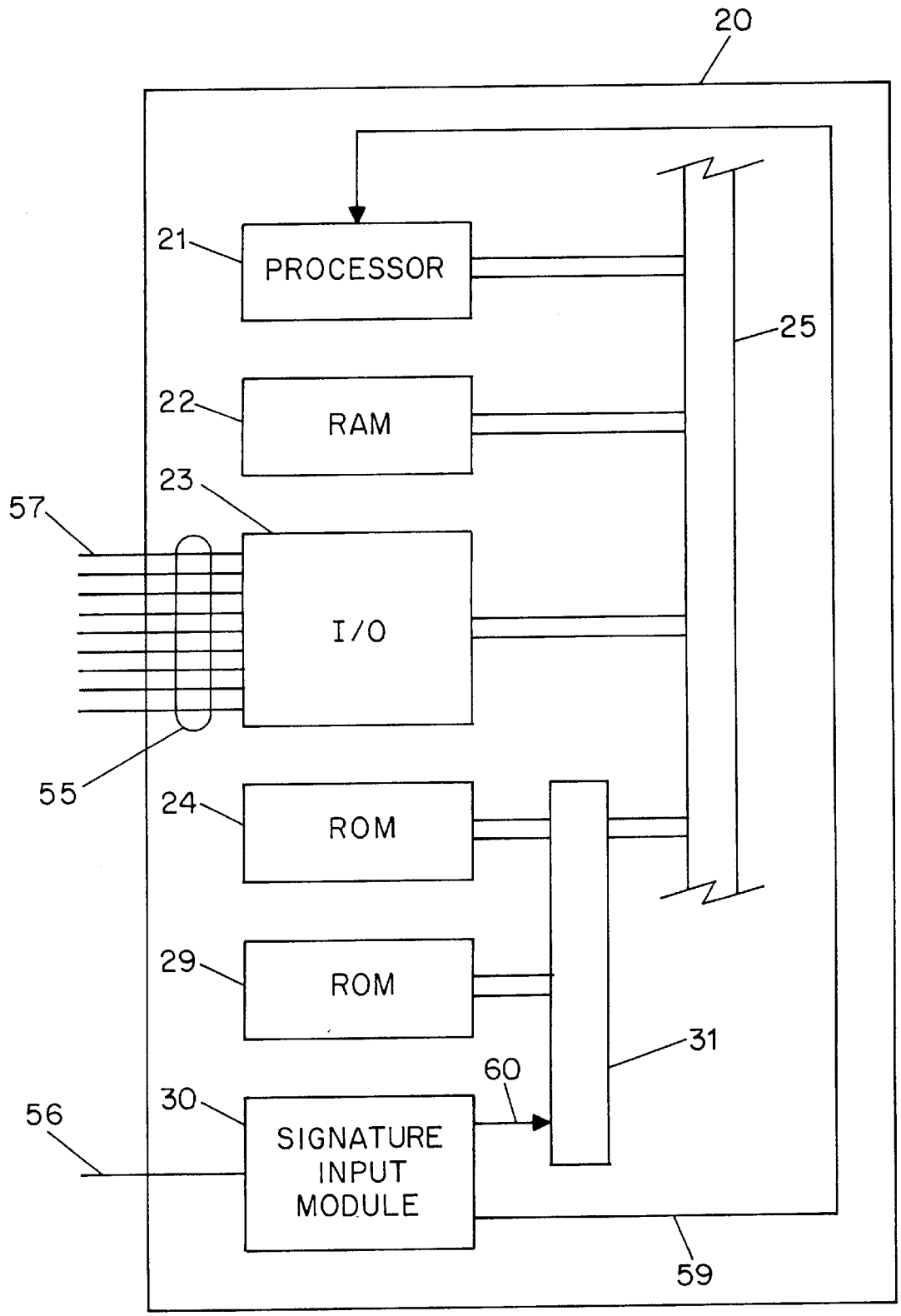
FIG. 3 is a functional block diagram of the hardware of a bank-switching embodiment of the invention.

For simplicity of design and economical use of chip resources, the preferred dedicated-hardware way of extracting signatures is by appropriate modification to the processor of the controller, and to the associated memory devices, in the fabrication process. Shown in FIG. 3 is a plain-vanilla controller according to the invention, prior to masking in or other loading of the application program of the controller. Also shown is a signature input module 30 which detects some predetermined state as a signature extraction input signal 56 to the chip. The input module 30, when triggered, sends an interrupt 59 to the processor 21. The interrupt service routine is stored in a part of the chip, memory 29, that is fixed in content, unaffected by any masking to area 24 where the application program is stored. As a result, the programmer writing the application program has no opportunity to modify the contents of the program that extracts signatures if there is not enough address space to accomodate both 24 and 29.

Figure 4:
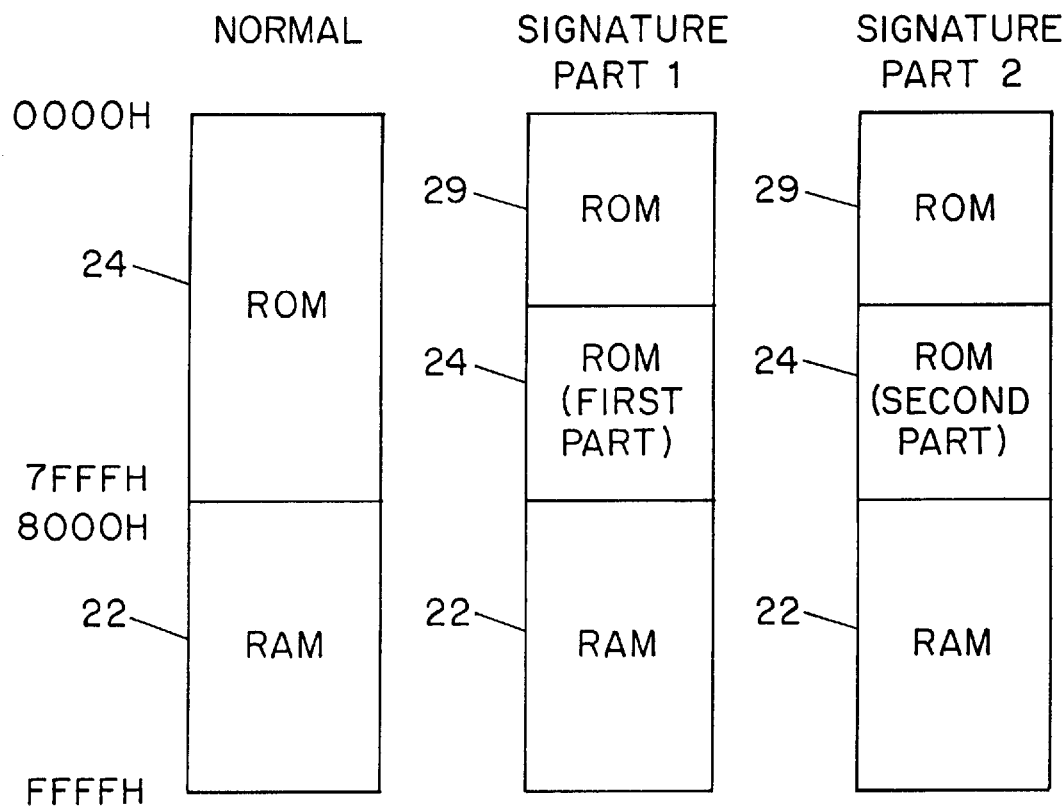
FIG. 4 is an address space depiction showing the bank switching of the system of FIG. 3.

One way to accomplish this is by bank-switching of the range of memory addresses containing the interrupt service routines. In FIG. 3 is shown a preferred bank-switching circuit 31, which is controlled by lines 60. In the normal state (e.g. when line 56 is in a quiescent state) the decoding of device 31 is such that the address space of the processor 21 is just like that of FIG. 1. Typically, a portion of the address space is taken up by ROM 24, as shown in FIG. 4, while another portion of the address space is RAM 22. When the application of the controller is running, the processor is fetching instructions from the ROM 24 portion of the address space. The addresses associated with the RAM 22, as shown in FIG. 4, are used for computation and temporary memory storage.

When the signature-extraction signal 56 is received, the input module 30 interrupts the processor, and causes a change in the behavior of the bank switching circuit 31, via line 60. The bank switcher 31 simply decodes addresses from the bus 25 differently, so that decoding occurs as in the Signature Part 1 region of FIG. 4. The processor 21, executing its interrupt service routine, fetches instructions from the ROM 29 since it is now receiving memory access signals for the low-numbered addresses. Meanwhile a first portion of the ROM 24 has been remapped to a part of address space such as that shown in the figure. Address decoding in this embodiment for the RAM 22 remains unchanged.

The software in ROM 29 causes the processor to extract the signature from the portion of ROM 24 available to the processor. When that task is complete, the processor sends a signal via the bus 25 to the bank switching circuit 31, so that the bank switcher 31 now decodes addresses as shown in the Signature Part 2 portion of FIG. 4. The software in ROM 29 now causes the processor 21 to extract the signature from the remaining portion of the ROM 24. The complete signature is then emitted serially via output line 57.

The particular manner in which the signature-extraction program of ROM 29 is made available to the processor 21 may be varied, as will be appreciated by those skilled in the art, without deviating from the invention. The address space of the processor 21 might be large enough to accommodate all memories 22, 24, and 29 at all times, in which case there would be no need to have three different bank-switched regimes as shown in FIG. 4. In that case, the bank-switching may simply be an exchange of the two ROMs 24, 29 in address space.

When the interrupt service routine of ROM 29 is executed, all other interrupts are disabled, the signature is extracted from the application memory 24, and the signature is serialized and outputted on a data line 57.

Figure 5:
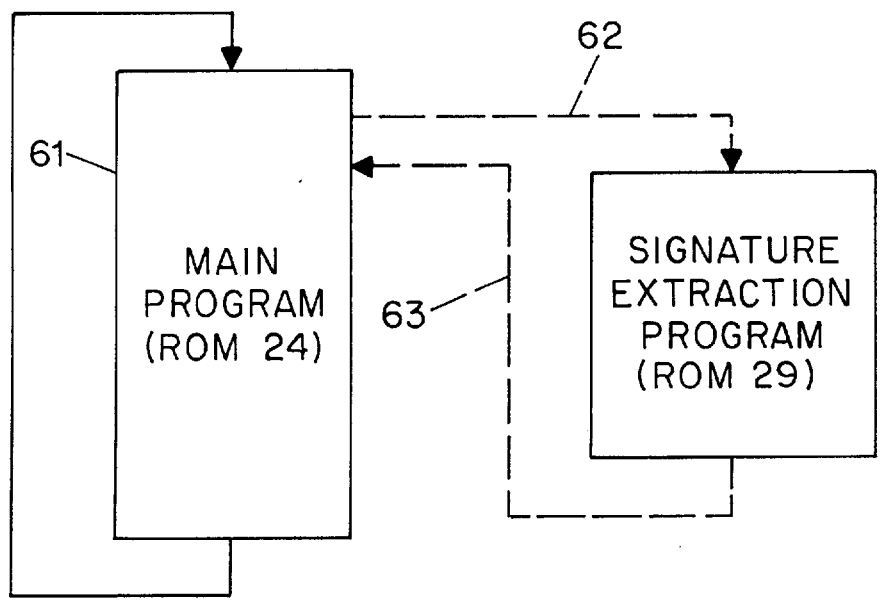
FIG. 5 shows in flowchart form the main routine of a controller and the signature extraction routine.

FIG. 5 shows in flowchart form the relation between the main program 61 of the controller, contained in ROM 24, and the signature extraction program 62, contained in ROM 29. The main program of the controller is symbolized by a "main loop" of main program 61, which runs more or less continuously after the controller 20 has been powered up. This main loop accomplishes the main function of the controller, which may be any function for which a controller is used, such as the abovementioned functions, e.g. serialization of keystroke data, receipt of serialized keystroke data, power and peripheral control in a laptop computer, or control of all functions in a simpler device such as a microwave oven or medical device.

The dotted line 62 depicts schematically the transfer of control triggered by an interrupt, here the interrupt indicating that it is desired to obtain a signature from the protected memory 24. Just as with interrupts used in the application program, a return address is pushed onto the stack, so that when the signature extraction routine finishes and returns, execution will resume as if the signature extraction interrupt had not occurred. This is suggested in FIG. 5 by dotted line 63.

It should be appreciated that while a dedicated hardware interrupt and associated interrupt service routine represent one way of accomplishing such a transfer of control, there are other ways to bring about this result. For example, if a standard, off-the-shelf controller is to be used, it is desirable that the input generating the signature be one that is quite unlikely to arise in ordinary use. Preferably the input comprises an input line 56 (see FIG. 1) held high for a very long time, the input line being a line that normally is used for some different purpose and is normally high only for brief intervals. Detection of the input is preferably accomplished by polling; a background process of the controller 21 polls the line at a rate determined by a clock, and a history is kept. The background process monitors the history and if the input line is in the asserted state for a predetermined interval, the background process transfers control to the signature extraction routine.

We claim:

1. A stored program system comprising a processor within an integrated circuit;

a bus operatively coupled with the processor;

a memory within the integrated circuit and coupled with the bus from which the processor fetches instructions, said memory having contents;

protection means within the integrated circuit and operatively coupled with the memory and with the bus, said protection means rendering the memory not readily readable by a user;

input means within the integrated circuit receiving an input external to the integrated circuit and generating a signal indicative thereof;

signature extraction means within the integrated circuit and operatively coupled with the memory, said signature extraction means responsive to the signal for reading substantially all the contents of the memory via the bus and extracting a signature reflective thereof; and output means within the integrated circuit and operatively coupled with the signature extraction means and responsive to extraction of the signature for communicating the signature external to the integrated circuit, wherein the signature extraction means comprises the processor executing a stored program stored within the memory, wherein the stored program comprises a routine evaluating a polynomial taking bytes of data from the memory as input, each byte having an address, the polynomial having at least one coefficient that is large relative to the value of the bytes, the stored program further comprising repeatedly subtracting a prime number smaller than the at least one coefficient.

2. The system of claim 1 wherein the polynomial also takes as input the addresses from which the bytes of data are taken.

3. A stored program system comprising a processor within an integrated circuit;

a bus operatively coupled with the processor;

a memory within the integrated circuit and coupled with the bus from which the processor fetches instructions, said memory having contents;

protection means within the integrated circuit and operatively coupled with the memory and with the bus, said protection means rendering the memory not readily readable by a user;

input means within the integrated circuit receiving an input external to the integrated circuit and generating a signal indicative thereof;

signature extraction means within the integrated circuit and operatively coupled with the memory, said signature extraction means responsive to the signal for reading substantially all the contents of the memory via the bus and extracting a signature reflective thereof; and output means within the integrated circuit and operatively coupled with the signature extraction means and responsive to extraction of the signature for communicating the signature external to the integrated circuit, wherein the signature extraction means comprises circuitry within the integrated circuit and apart from the processor, wherein the circuitry evaluates a function comprising a polynomial taking bytes of data from the memory as input, the polynomial having at least one coefficient that is large relative to the value of the bytes, the function further comprising a modulo function with respect to a prime number smaller than the coefficient.

4. The system of claim 3 wherein the polynomial also takes as input the addresses from which the bytes of data are taken.

* * * * *